United States Patent [19]
Grögler et al.

[11] Patent Number: 4,786,655
[45] Date of Patent: Nov. 22, 1988

[54] PROCESS FOR THE PREPARATION OF POLYURETHANES CONTAINING URETDIONE RINGS FORMED IN THE PRESENCE OF A BISMUTH SALT OF AN ORGANIC CARBOXYLIC ACID

[75] Inventors: Gerhard Grögler; Heinrich Hess, both of Leverkusen; Richard Kopp, Köln, all of Fed. Rep. of Germany

[73] Assignee: Bayer Aktiengesellschaft, Leverkusen, Fed. Rep. of Germany

[21] Appl. No.: 120,303

[22] Filed: Nov. 13, 1987

[30] Foreign Application Priority Data

Nov. 29, 1986 [DE] Fed. Rep. of Germany ....... 3640855

[51] Int. Cl.$^4$ .................... C08J 9/00; C08G 18/00; C08G 18/14; C08G 18/08
[52] U.S. Cl. ............................ 521/93; 521/160; 521/161; 528/55; 528/67; 528/73
[58] Field of Search ............................ 528/55, 67, 73; 521/160, 161, 93

[56] References Cited
U.S. PATENT DOCUMENTS

| | | | |
|---|---|---|---|
| 3,248,370 | 4/1966 | Reischl et al. | 260/75 |
| 3,794,621 | 2/1974 | Meckel et al. | 260/75 |
| 3,903,052 | 9/1975 | Wagner et al. | 528/59 |
| 3,998,794 | 12/1976 | Müller et al. | 521/161 |
| 4,442,280 | 4/1984 | Grögler et al. | 528/503 |
| 4,483,974 | 11/1984 | Grogler et al. | 528/68 |
| 4,520,186 | 5/1985 | Hess et al. | 528/73 |
| 4,584,362 | 4/1986 | Leckart et al. | 528/55 |
| 4,667,008 | 5/1987 | Grogler et al. | 528/67 |
| 4,742,090 | 5/1988 | Hunter et al. | 528/55 |

OTHER PUBLICATIONS

Hofmann, Berichte 3 (1870), pp. 765-766.

Primary Examiner—Harold D. Anderson
Assistant Examiner—Dennis R. Daley
Attorney, Agent, or Firm—Gene Harsh; Joseph C. Gil; Richard E. L. Henderson

[57] ABSTRACT

Polyurethanes containing uretdione rings are produced by reacting a polyisocyanate containing a uretdione ring with a relatively high molecular weight dihydroxyl compound in the presence of a bismuth salt of an organic carboxylic acid and a low molecular weight aromatic diamine. The low molecular weight aromatic diamine is used in a quantity which is 5 to 10 times the quantity of bismuth salt used. These solid polyurethanes are formed in relatively short reaction times and possess outstanding mechanical properties.

6 Claims, No Drawings

PROCESS FOR THE PREPARATION OF POLYURETHANES CONTAINING URETDIONE RINGS FORMED IN THE PRESENCE OF A BISMUTH SALT OF AN ORGANIC CARBOXYLIC ACID

BACKGROUND OF THE INVENTION

This invention relates to a process for the preparation of polyurethanes from diisocyanates containing uretdione rings.

It is known in the art (DE-PS No. 1,153,900) to react diisocyanates containing uretdione groups with relatively high molecular weight polyhydroxyl compounds and optionally difunctional chain lengthening agents to produce polyurethanes. In order to achieve sufficient polyaddition of the uretdione-containing diisocyanates (which are generally high melting and only sparingly soluble), it is usually necessary to employ reaction temperatures above 100° C. Use of such temperatures may however result in the opening of the uretdione rings and the initially straight chained polyurethanes may undergo a much greater degree of cross-linking than desired.

Substantial lowering of the solidification temperature and shortening of the solidification time in the curing process by using catalysts of the kind conventionally used in polyurethane chemistry, e.g. organic metal salts or tertiary amines have been attempted. However, the density of cross-linking is found to be undesirably increased and the mechanical properties of the polyurethane are seriously impaired.

The same problems are encountered when solid uretdione diisocyanates with delayed reactivity such as those which have been described in DE-OS No. 3,230,757 are used for the preparation of storage stable mixtures of so-called one component systems for the production of polyurethanes. In these cases, again, the use of organic lead or tin compounds as the preferred catalysts cannot completely prevent opening of the uretdione rings and the attendant undesirable side reactions.

SUMMARY OF THE INVENTION

It is therefore an object of the present invention to optimize the known processes for the preparation of polyurethanes from the usually high melting and sparingly soluble diisocyanates containing uretdione rings so that back formation into diisocyanates and opening of the uretdione rings with formation of biuret and allophanate groups and hence cross-linking would to a large extent be avoided. It is also an object of the present invention to provide a process for the production of polyurethanes in which the polyaddition products rapidly change from their wax-like state to the desired elastic end state and could be released from the mold after a very short time for further processing.

These and other objects which will be apparent to those skilled in the art are accomplished by reacting an organic polyisocyanate which is at least 50 wt. % diisocyanate containing a uretdione ring with a relatively high molecular weight dihydroxyl compound in the presence of a catalyst and a low molecular weight aromatic diamine. The catalyst is a bismuth salt of an organic carboxylic acid. The aromatic diamine is used in a quantity which is from 5 to 10 times the quantity of bismuth salt used.

DETAILED DESCRIPTION OF THE INVENTION

The present invention relates to a process for the production of optionally foamed polyurethanes by the reaction of organic polyisocyanates containing at least 50 wt. % of a diisocyanate having uretdione rings with a relatively high molecular weight dihydroxyl compound preferably with a molecular weight of from 500 to 10,000, and optionally low molecular weight diols as chain lengthening agents, preferably with a molecular weight of from 62 to 400, in the presence of a catalyst, a low molecular weight aromatic diamine and optionally other auxiliary agents and additives. The catalyst used is a bimuth salt of an organic carboxylic acid. The low molecular weight aromatic diamine preferably has a molecular weight of from 108 to 600 and is used in a quantity of from 5 to 10 times the quantity of bismuth salt.

The use of bismuth salts as catalysts for the preparation of polyurethanes from conventional diisocyanates has already been described in U.S. Pat. No. 4,584,362 but polyisocyanates containing uretdione rings were not mentioned. When polyisocyanates containing uretdione groups or their delayed action forms (which are preferably used in one-shot processes for preparing polyurethanes from storage stable systems) are reacted with hydroxyl compounds in the presence of bismuth salts, the desired rapid reaction and short solidification time are obtained. However, faults such as cavities or so-called "shell cracks" are found in the end products if the reactive system is exposed to atmospheric moisture and the mechanical properties of the products are seriously impaired. It has now surprisingly been found that when organic bismuth salts are used in combination with low molecular weight aromatic diamines, the desired short reaction times with high conversion rates and the desired solidification times are obtained and substantially perfect end products with outstanding mechanical properties are produced.

The bismuth salts of organic carboxylic acids used are preferably salts of organic carboxylic acids having from 2 to 20 carbon atoms. Bi(III)-2-ethylhexanoate has been found to be a highly effective bismuth activator. Particularly suitable organic bismuth salts are those prepared from organic carboxylic acids corresponding to formula (I)

R—COOH     (I)

in which R represents a $C_1$–$C_{20}$-alkyl, $C_4$–$C_{20}$-cycloalkyl, $C_6$–$C_{20}$ or $C_7$–$C_{20}$ aralkyl group and inorganic bismuth salts. The R group is preferably methyl, octyl, cyclohexyl, phenyl, tolyl or naphthyl.

The organic bismuth salts are preferably used in a quantity of 0.01 to 5 wt. %, more preferably 0.05 to 2.0 wt. %, based on the quantity of the starting components.

In the process of the present invention, the bismuth activators are used in combination with low molecular weight aromatic diamines. The aromatic diamines are added to the starting materials in 5 to 10 times the quantity of bismuth salt. It is immaterial whether the aromatic diamines are used in the solid or liquid form. If they are solid, however, the particle size should not exceed 50 to 100μ in a one-component system.

Examples of low molecular weight aromatic diamines, including hetero-aromatic amines, which preferably have molecular weights in the range from 108 to 600 include p-phenylene diamine; 2,4/2,6-tolylene-diamine; diphenylmethane-4,4'- and/or 2,4'- and/or -2,2'-diamines; 3,3'-dichloro-4,4'-diaminodiphenyl-methanes; 3-($C_1$-$C_8$-alkyl)-4,4'-diaminodiphenyl-methanes; 3,3'-di-($C_1$-$C_4$)-4,4'-diaminodiphenyl-methanes; 3,3',5,5'-tetra-($C_1$-$C_4$)-alkyl)-4,4'-diphenylmethanes; 4,4'-diaminodiphenyl-sulphides, -sulphoxides and -sulphones; diamines containing ether groups such as those disclosed in DE-A No. 1,770,525 and 1,809,172 (U.S. Pat. Nos. 3,654,364 and 3,736,295); 2-halogen-1,3-phenylene-diamines optionally substituted in the 5-position (DE-A Nos. 2,001,772, 2,025,896 and 2,065,869); bis-anthranilic acid esters (DE-A Nos. 2,040,644 and 2,160,590); 2,4-diamino-benzoic acid esters (DE-A No. 2,025,900) and tolylenediamines substituted by one or two ($C_1$-$C_4$)-alkyl groups. Particularly preferred are 3,5-diethyl-2,4- and/or -2,6-diaminotoluene (especially their commercial 80/20 or 65/35 isomeric mixtures), asymmetrically tetraalkyl substituted diaminodiphenyl methanes such as 3,5-diethyl-3',5'-diisopropyl-4,4'-diaminodiphenylmethane, 4,4'-diaminobenzanilide, 3,5'-diaminobenzoic acid-($C_1$-$C_4$)-alkyl esters, 4,4' and/or 2,4'-diaminodiphenylmethane, and naphthylene-1,5-diamine.

The diisocyanates containing uretdione rings (dimeric diisocyanates) used in the present invention are preferably solid diisocyanates with melting points above 40° C., preferably above 80° C., most preferably above 130° C. These have been described in DE-OS No. 3,403,500. Examples of such diisocyanates include: tolylene-2,4-diisocyanate, dimeric 4,4'-diisocyanato-diphenylmethane and its oligo dimers, straight chained homologs (e.g. with up to 4 uretdione rings in the molecule), dimeric 2,4'-diisocyanato-diphenylsulphide, dimeric 4,4'-diisocyanato-diphenylsulphide, dimeric 4,4'-diisocyanatodiphenylsulphone and all other known aromatic uretdione diisocyanates and mixtures of such uretdione diisocyanates. Dimeric tolylene-2,4-diisocyanate and dimeric 2,4'- and/or 4,4'-diisocyanatodiphenylmethane are preferred.

The preparation of uretdione diisocyanates from the corresponding diisocyanates is well known. (See Hofmann, Berichte 3 (1870), pages 765–766.) The preparation of, for example, dimeric tolylene-2,4-diisocyanate has been described in detail in Kunststoffhandbuch Volume 7, Polyurethane, published by Vieweg/-Hochtlen, Carl-Hanser-Verlag, Munich 1966, page 16. More specifically, uretdione diisocyanates may be prepared by dimerization of the above-mentioned diisocyanates with catalysts such as trialkylphosphites (DE-OS No. 2,349,726), peralkylated carbamoylphosphites (U.S. Pat. No. 3,290,288), peralkylated aminophosphines (U.S. Pat. No. 3,290,288), 3- or 4- substituted pyridines such as 4-dimethylaminopyridine (GB-PS Nos. 821,158, 944,309, 962,689), trialkylphosphines (highly reactive substances sensitive to air, DE-OS No. 2,420,475), dialkylarylphosphines and alkyldiarylphosphines (U.S. Pat. No. 2,671,082), trialkylarsines (Analytical Chemistry of the Polyurethanes, Volume 16/III, High Polymers Series (Wiley 1969), pages 112 to 131), dibutyl tin dilaurate (DE-OS No. 2,420,475), without a catalyst in a carboxylic acid ester (USSR-PS No. 149,775) or in aqueous emulsion (GB-PS No. 1,134,285).

Oligomeric uretdione diisocyanates corresponding to the general formula (II)

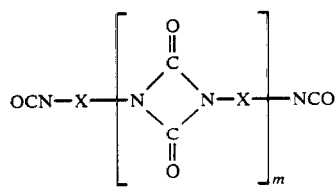

(II)

in which
X represents an aromatic group and
m represents an integer of from 1 to 5,
may also be used in the practice of the present invention. The uretdione diisocyanate obtained from 4,4'-diphenylmethane diisocyanate (preferred) may advantageously be prepared at low temperatures (e.g., 20° C.) by the addition of a catalyst in only slightly polar solvents such as aliphatic hydrocarbons (m=1-2).

In addition to the diisocyanates containing uretdione rings, up to 50 wt. %, based on total isocyanates, of other diisocyanates may be used. Examples of such isocyanates are given in DE-OS No. 3,230,757.

If the preparation of polyurethanes by the process of the present invention is carried out with a so-called one-component PU reactive system, then the diisocyanates are preferably used in blocked form, i.e. with retarded reactivity. The preparation of diisocyanates with retarded reactivity is known in the art and has been described, for example, in DE-OS No. 3,230,757 and DE-OS No. 3,403,500.

The other starting compounds used for the preparation of polyurethanes in accordance with the present invention include relatively high molecular weight compounds containing H-active groups of the kind commonly used in polyurethane chemistry. These compounds preferably have molecular weights in the range of from 500 to 10,000 and the H-active groups are mainly hydroxyl groups but may also include amino groups. Specific examples of such compounds are given in DE-OS No. 3,230,757.

Low molecular weight chain lengthening agents which may optionally be used include diols, preferably with molecular weights of from 62 to 400, in which the hydroxyl groups are preferably attached to aliphatic and/or cycloaliphatic groups. These compounds are disclosed, e.g., in DE-OS No. 3,230,737.

Other optional auxiliary agents and additives include: dyes and pigments; fillers such as silica gel, gypsum, talc and active charcoal; UV absorbents; stabilizers such as phenolic anti-oxidants; light protective agents; blowing agents; surface-active additives such as emulsifiers or foam stabilizers and optionally cell regulators; antiblocking agents; silicones; flame retardants and fungistatic and/or bacteriostatic substances.

The preparation of polyurethanes according to the present invention may be carried out by any of the known procedures such as those using a one-component or a two-component system. The use of a one-component PU reactive system as starting mixture is preferred.

Suitable one-component systems may be prepared, for example, by the procedure described in DE-OS No. 3,230,757. More specifically, a solid diisocyanate preferably having a particle size of from 5 to 100μ and preferably in its blocked form is mixed with a relatively high molecular weight H-active compound, optionally low molecular weight diol, the organic bismuth salt, the low molecular weight aromatic diamine and optionally other additives. The system is preferably heated to a temperature of 100° C. to 150° C. to produce the polyurethane. Sufficiently solidified polyurethanes or molded polyurethane products with a faultless structure and excellent mechanical properties can be removed from the mold within a very short time (i.e., 1 to 2 minutes).

The process employed for shaping the one-component system depends upon its characteristics. A liquid system which is pourable at 25° C. may be worked up by a casting process and the system may be briefly heated (e.g. to 50°-70° C.) before it is processed.

Systems which are not sufficiently pourable to be cast but are to some extent fluid may be applied to their supports by means of a coating knife and then solidified by a thermal shock.

Plastic systems (pastes) may be molded under heat and pressure.

Solid systems, especially those based on diols with a relatively high melting point (45° to 65° C.) may either be molded under pressure (injection molded) or shaped at or above the melting point of the diol. A previously prepared one-component system may be converted into a solid granulate and introduced in this form into a mold which has been heated to a temperature above the melting point of the diol (generally below 70° C.). When the granulate has melted and thus filled the mold, the mold is heated to 100°-120° C. and the contents are solidified.

The elastomeric polyurethanes produced by the process of the present invention are suitable for use as foils or sheets, as fabric coatings, e.g. on textiles and/or conveyor belts and for the production of castings.

The invention is further illustrated but is not intended to be limited by the following examples in which all parts and percentages are by weight unless otherwise specified.

EXAMPLES

Example 1

1000 g of a linear polyester of adipic acid and diethylene glycol (OH number 43) which was liquid at 25° C. were thoroughly dehydrated at 100° to 120° C. in a vacuum. 1.5 g of 1-amino-3,3,5-trimethyl-5-aminomethylcyclohexane (IPDA) were then added at room temperature. After the further addition of 170 g of dimeric 2,4-diisocyanatotoluene (TT) in the form of a finely ground powder (particle size 5 to $20\mu$), the uretdione diisocyanate was evenly distributed in the reaction mixture by means of a stirrer. The suspension had a viscosity of about 25,000 mPas/RT and was stable in storage at room temperature for several months. The product gradually solidified but only in the heat and only inferior products were obtained. In order to achieve satisfactory solidification of the samples at lower temperatures, the catalysts shown in Table 1 were added to the various samples of reaction mixtures and one set of samples was worked up as described below in the absence of atmospheric moisture while another set was worked up after 4 hours' exposure to atmospheric moisture.

The solidification of samples 2 to 3 mm in thickness after exposure to the given temperature for 2 minutes was determined on an electric hotplate adjusted to 120° C. The ease with which the plates ($\sim 5 \times 5$ cm) could be lifted from the tack-free surface was used as the characterizing feature.

TABLE 1

| Catalyst | Quantity (g) | Exposure to Heat (min) | Atmospheric moisture with | Atmospheric moisture without | Property of the polyurethane |
| --- | --- | --- | --- | --- | --- |
| Bismuth octoate Diamine[1] | 0.2 1.0 | 2 | tack-free surface, rubber-like | tack-free surface, rubber-like | homogeneous structure |
| Bismuth octoate | 0.2 | 2 | tack-free surface, rubber-like | tacky surface | non-uniform structure |
| Diazo-bicyclooctoate[2] | 0.5 | 2 | tack-free surface, rubber-like | tacky surface | non-uniform structure |
| Lead octoate | 0.2 | 2 | tack-free surface, rubber-like | tacky surface | non-uniform structure |

[1]Diamine = 2,4-diamino-3,5-diethyltoluene-
[2]Available under the name Dabco from Air Products Sample plates were then prepared from the resulting polyurethanes by the usual methods. After they had been tempered at 120° C. for 2 hours, the elastomers showed marked differences in their mechanical properties. Those mechanical properties are reported in Table 2.

TABLE 2

| | Degasified without atmospheric moisture | | | | With atmospheric moisture |
| --- | --- | --- | --- | --- | --- |
| Catalyst | Bismuth octoate/ diamine[1] | Bismuth octoate | Diazo bicyclo- octoate[2] | Lead octoate | Bismuth octoate/diamine |
| Shore hardness A DIN 53 505 | 82 | 80 | 60 | 62 | 80 |
| Tensile strength (MPa) DIN 53 504 | 22.5 | 19.5 | 2.2 | 2.1 | 20.5 |
| Tear propagation resistance (KN(m)) DIN 53 515 | 800 | 750 | 150 | 100 | 800 |
| Elasticity (%) | 47 | 45 | 35 | 36 | 46 |

The mechanical properties of elastomers prepared with lead octoate and diazo-bicyclooctoate were so poor that they were unsuitable for use as coating materials even when prepared with the exclusion of atmospheric moisture. Products prepared with bismuth octoate had improved mechanical properties and a uniform structure only if they were prepared with the exclusion of atmospheric moisture. Products with excellent mechanical properties and a uniform structure even when prepared in the presence of atmospheric moisture were obtained only with the bismuth salt and diamine combination according to the invention.

Example 2

150 g of liquid reaction mixtures prepared according to Example 1 with (a) 0.15 g of Bi-octoate or (b) 0.15 g of Bi-octoate and 3 g of 2,4-diamino-3,5-diethyltoluene were applied to metal sheets (zinc plated sheet iron) to form films about 1 mm in thickness. The film coated sheets were then exposed to atmospheric moisture (85% relative humidity) for about one hour. The films were then solidified at 120° C. The following results were obtained:

| Catalyst | Results after solidification |
| --- | --- |
| Bismuth octoate | Severe blistering, shell cracks |
| Bismuth octoate/ 2,4-diamino-3,5-diethyltoluene | Perfect, homogeneous film |

Example 3

500 g of a linear polypropylene glycol ether (MW 2000, OH number 56) were mixed with 151 g of dimeric TDI (TT) in the form of a milled powder and the suspension obtained was thoroughly homogenized by means of a mechanical stirrer. 20 g of 2,4-diamino-3,5-diethyltoluene were then added. The mixture obtained was stable for several hours at room temperature and the viscosity rose only slowly. When the mixture was heated (120° to 150° C.), however, cross-linking was unsatisfactory and the material was in part non-uniform and could be destroyed under tension and pressure. It was only when 2.0 g of a 50% bismuth octoate solution (bismuth 2-ethylhexanoate in cleaning petrol) were added that satisfactory solidification to an elastic polyurethane took place under the action of heat.

Sample plates were produced by storing the reaction mixtures at room temperature in the presence of atmospheric moisture for 2 hours and then casting them into a standard mold which had been treated with mold release agent and then heating them in the mold at 120° C. for 30 minutes to one hour.

The mechanical properties of the elastomer were determined after a short storage time at room temperature.

| Catalyst | Bismuth octoate/2,4-diamino-3,5-diethyltoluene |
| --- | --- |
| Hardness (Shore A) | 90 |
| Modulus (100%) (MPa) | 7.5 |
| Tensile strength (MPa) | 11.5 |
| Elongation at break (%) | 450 |
| Tear Propagation resistance (KN/m) | 30.5 |
| Elasticity (%) | 54 |

Example 4

The 500 g of polypropylene glycol ether used in Example 3 were replaced by 500 g of a linear polyoxytetramethylenediol having a molecular weight of 2000 (OH number 56). This diol was combined with 127.8 g of TT, 1.0 g of bismuth ocotate and 10 g of the diamine used in Example 3. Highly elastic polyurethanes having the mechanical properties shown below were obtained after 2 hours storage in atmospheric moisture and solidification by heat.

| Catalyst | Bismuth octoate/2,4-diamino-3,5-diethyltoluene |
| --- | --- |
| Hardness (Shore A) | 88 |
| Modulus (100%) (MPa) | 5.0 |
| Tensile strength (MPa) | 10.3 |
| Elongation at break (%) | 500 |
| Tear propagation resistance (KN/m) | 25.6 |
| Elasticity (%) | 65 |

Example 5

1.0 g of bismuth octoate was added to a suspension of 650 g of a linear dihydroxy polybutadiene having a molecular weight of 2600, 10 g of 2,4-diamino-3,5-diethyltoluene and 117.3 g of dimeric TDI (TT). The reaction mixture, which was liquid at room temperature, was solidified in the heat after being subjected to the procedure described in Example 3 and 2 hours' storage in atmospheric moisture. Highly elastic molded products were again obtained. The mechanical properties are shown below:

| Catalyst | Bismuth octoate/2,4-diamino-3,5-diethyltoluene |
| --- | --- |
| Hardness (Shore A) | 84 |
| Modulus (100%) (MPa) | 5.5 |
| Tensile strength (MPa) | 5.5 |
| Elongation at break (%) | 100 |
| Tear propagation resistance (KN/m) | 10.5 |
| Elasticity (%) | 63 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane in which
   (a) an organic polyisocyanate which is at least 50 wt. % diisocyanate containing a uretdione ring
   is reacted with
   (b) a relatively high molecular weight organic dihydroxyl compound
   in the presence of
   (c) a bismuth salt of an organic carboxylic acid and
   (d) a low molecular weight aromatic diamine in a quantity which is from 5 to 10 times the quantity of bismuth salt (c) used.

2. The process of claim 1 in which the bismuth salt (c) is used in a quantity of from 0.01 to 5 wt. % based on the total weight of the reactants.

3. The process of claim 1 in which the bismuth salt (c) is used in a quantity of from 0.05 to 2.0 wt. % based on the total weight of the reactants.

4. The process of claim 1 in which the bismuth salt (c) is a salt of an organic carboxylic acid having 2 to 20 carbon atoms.

5. The process of claim 1 in which the bismuth salt (c) is Bi(III)-2-ethyl hexanoate.

6. The process of claim 1 in which the aromatic diamine (d) is 3,5-diethyl-2,4-diaminotoluene, 3,5-diethyl-2,6-diaminotoluene or mixtures thereof.

* * * * *